United States Patent Office 3,711,472
Patented Jan. 16, 1973

3,711,472
OPTICAL BRIGHTENING AGENTS
Adolf Emil Siegrist, Basel, Peter Liechti, Binningen, Erwin Maeder, Aesch, Basel-Land, Leonardo Guglielmetti, Birsfelden, and Hans Rudolf Meyer and Kurt Weber, Basel, Switzerland, assignors to Ciba-Geigy AG, Basel, Switzerland
No Drawing. Original application Oct. 21, 1966, Ser. No. 588,318. Divided and this application Aug. 28, 1970, Ser. No. 68,013
Claims priority, application Switzerland, Oct. 28, 1965, 14,902/65; July 4, 1966, 9,649/66
Int. Cl. C09b 23/00, 23/14
U.S. Cl. 260—240 CA    6 Claims

ABSTRACT OF THE DISCLOSURE

The present invention relates to new compounds of the formula

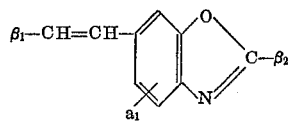

in which $a_1$ represents a hydrogen atom, a methyl group or a halogen atom, $\beta_1$ denotes a residue of the series phenyl, diphenyl, 1-naphthyl or 2-naphthyl and $\beta_2$ represents a residue of the series phenyl, diphenyl, styryl, stilbenyl, p-phenyl-stilbenyl, 1-naphthyl or 2-naphthyl, and in which terminal phenyl and naphthyl residues may contain alkyl, halogen or alkoxy groups.

These new compounds represent valuable optical brightening agents.

CROSS-REFERENCE TO RELATED APPLICATION

This application is divided out of our copending application Ser. No. 588,318 filed Oct. 21, 1966, now abandoned.

SUMMARY OF THE DISCLOSURE

The present invention comprises a process for the manufacture of heterocyclic compounds containing ethylene double bonds. This process is characterised by reacting a compound of formula (1)

in which $R_1$ represents a heterocyclic ring system of aromatic character which (a) contains at least one 5-membered or 6-membered heterocyclic ring with at least one ring nitrogen atom, (b) is free of hydrogen atoms which (1) are bonded to ring nitrogen atoms and (2) which are replaceable by alkali metal, and (c) is bonded to a ring member of $R_2$ by means of a ring member or has two adjacent ring members in common with two adjacent ring members of $R_2$, in which $R_2$ denotes a carbocyclic or heterocyclic ring system of aromatic character which contains 6 ring members, and which optionally is condensed with further aromatic or hydroaromatic ring systems, and in which (b) the methyl group shown in the formula is in a p-position to the bond to $R_1$, is reacted with a Schiff base in the presence of a strongly basic alkali compound, with the reaction medium to be used being a strongly polar, neutral to basic, organic solvent which (I) is free of atoms, especially hydrogen atoms, which are replaceable by alkali metal and (II) is practically anhydrous, except in the case of the use of an alkali hydroxide as the strongly basic alkali compound in which case the alkali hydroxide may have a water content of up to 25%.

Within the framework of the present invention 2 main types of reactions according to Formula 1 are above all of importance, and these may be circumscribed as follows:

(1) The reaction of anils of aldehydes of aromatic character, in the manner described under Formula 1, with compounds of formula (1a)

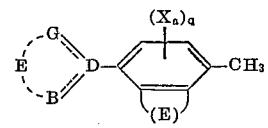

in which formula (a) G, B and D each denote a ring atom of a 5-membered or 6-membered ring system of aromatic character, with at least one of the symbols G, B and D representing a nitrogen atom, and where D may instead of nitrogen also denote a carbon atom and G as well as B may represent carbon, nitrogen, oxygen or sulphur atoms in the arrangement of ring systems which are in themselves known, (b) E represents the ring member supplementation to give a 5-membered or 6-membered ring system of aromatic character, containing carbon, nitrogen, oxygen or sulphur atoms in the arrangement of ring systems which are in themselves known, and in which (c) the rings which are formed conjointly with the symbol E may contain further substituents, which like the substituent $X_a$ do not contain any atoms which may be replaced by alkali, especially hydrogen atoms, and $p$ represents the numbers 0 or 1 and $q$ the numbers 0, 1, 2 or 3.

The aforementioned substituents may be of any desired aliphatic, cycloaliphatic, araliphatic or aromatic nature or may represent functional substituents (e.g. carboxylic acid ester groups and the like) as long as they fulfill the preceding condition.

(2) A further important application of the reaction category disclosed under Formula 1 comprises the reaction of anils of aldehydes of aromatic character, in the manner given under Formula 1, with compounds of formula (1b)

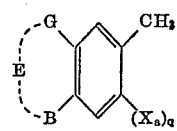

in which formula (a) G and B each denote a ring atom of a 5-membered or 6-membered ring system of aromatic character and may represent carbon, oxygen, sulphur or nitrogen atoms, but at least one of the symbols G or B represent a nitrogen atom, and these atoms are present in the arrangement of ring systems which are in themselves known, (b) E denotes the ring member supplementation to form a 5-membered or 6-membered ring system of aromatic character, containing carbon, nitrogen, oxygen or sulphur atoms in the arrangement of ring systems which are in themselves known, and in which (c) the ring formed together with the symbol E may contain further substituents, which like the substituent $X_a$ do not contain any atoms replaceable by alkali, especially hydrogen atoms, and $q$ may denote the numbers 0, 1, 2 or 3.

These substituents may again, as explained under Formula 1a, be of any desired aliphatic, cycloaliphatic, araliphatic or aromatic nature or may represent functional substituents (e.g. carboxylic acid ester groups).

The reaction which has been discovered in the present process is based in principle on a reaction of the methyl group of compounds of formula category (1) with the azomethine grouping of a Schiff base (for example benzalaniline) with elimination of the amine components, according to the following scheme:

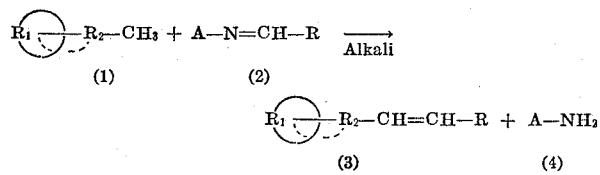

Here $R_1$ and $R_2$ have the significance given above, A—N= represents an amine residue and =CH—R represents an aldehyde residue, in which R denotes a residue of an aldehyde of aromatic character.

The heterocyclic ring system $R_1$ may consist of one or more rings. At the same time it is a prerequisite in all cases that this ring system $R_1$ should contain a heterocyclic ring, having 5 to 6 ring members and containing ring nitrogen atoms, this ring in turn being bonded to $R_2$, and in fact either (a) in such a way that one ring atom of this heterocyclic ring is bonded to a ring atom of $R_2$ by means of one bond, or (b) that this heterocyclic ring has two, in each case adjacent, ring atoms in common with $R_2$, that is to say that it forms a condensed ring system. The statement that the ring system $R_1$ may consist of one or more rings, denotes that for example (a) $R_1$ consists only of one heterocyclic ring having 5 to 6 ring members and containing ring nitrogen atoms, or (b) a heterocyclic compound as defined under (a) contains further carbocyclic rings (especially 6-rings) condensed to it (preferably a benzene or naphthalene ring), or (c) a heterocyclic compound as defined under (a) contains further aromatic rings of carbocyclic or heterocyclic nature bonded via a single valence (that is to say not condensed), or (d) a heterocyclic compound as defined under (a) is condensed with further heterocyclic rings, in which case hetero-atoms may also be common to two rings, or (e) combinations of the abovementioned variants with one another.

One of the reagents to be used for the process of the invention, namely the compound according to Formula 1, is capable of very broad variation within the framework of the definition given above.

The text which follows summarises the basic types and some selected classes of compounds according to Formula 1, without thereby imposing a limitation to these formulae.

(A) Compounds of formula (5)

in which R denotes a heterocyclic ring system which contains a 5-membered to 6-membered heterocyclic ring with two adjacent ring members which are directly bonded to $R_2$ and at least one nitrogen atom which is exclusively bonded into the ring, and $R_1$ denotes a benzene ring condensed with the hetero-ring, with the two carbon atoms which belong to both rings and with the carbon atom bonded to the $H_3C$-group being in the 1,2,4-position relative to one another. In this case the benzene residue $R_2$ is with advantage monocyclic and the heterocyclic ring of the residue $R_1$ is only condensed with $R_2$. The latter may however of course still contain monovalent substituents, e.g. hydrocarbon residues, which may, like benzene residues or diphenyl residues, also be cyclic. Here emphasis should be placed on the compounds of formula (6)

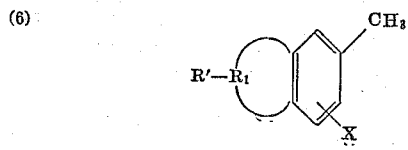

and especially on the benzoxazoles of formula (7)

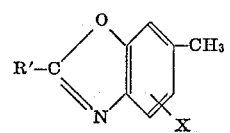

in which R' denotes a benzene residue or naphthalene residue, X a hydrogen atom, a chlorine atom, a methoxy group or a methyl group and $R_1$ a 5-membered heterocyclic ring with a nitrogen atom exclusively bonded into the ring, this ring being condensed with the benzene ring in the manner stated. As has been stated, the benzene residue R' may contain further substituents, e.g. those mentioned for X, or further singly bonded benzene residues.

(B) Compounds of formula (8)

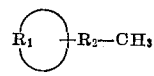

in which $R_1$ denotes a heterocyclic ring system which contains at least one 5-membered to 6-membered heterocyclic ring with a ring member which is directly bonded to $R_2$ and a nitrogen atom which is exclusively bonded into the ring, and $R_2$ represents a benzene residue or naphthalene residue bonded to $R_1$ and to the $H_3C$-group in the 1,4-position. Here the ring system $R_1$ preferably consists of a 5-membered to 6-membered heterocyclic ring and a benzene or naphthalene ring condensed with this ring, with the rings referred to again being able to have further substituents, as may be the case for compounds of formula

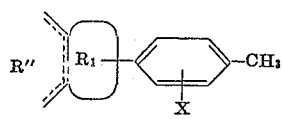

in which R" denotes a benzene residue or naphthalene residue condensed with $R_1'$ in the manner indicated by the valency lines, $R_1'$ denotes a 5-membered to 6-membered heterocyclic ring with a ring member directly bonded to the methylphenyl residue and with at least one nitrogen atom exclusively bonded into the ring, and X denotes a hydrogen atom, a chlorine atom, a methoxy group or a methyl group. Possible compounds are especially triazole, oxazole and diazine compounds, for example compounds of formulae (10)

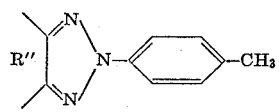

(11)

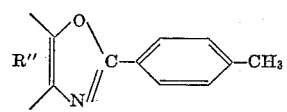

and (12)

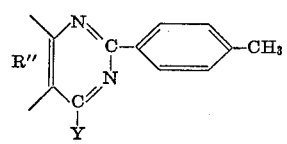

in which R" denotes a benzene or naphthalene ring, condensed with the triazole, oxazole or diazine ring in the manner indicated by the valency lines, and Y denotes a hydrogen atom or a benzene residue.

(C) Compounds of formula (13)

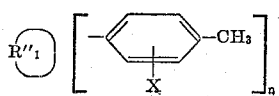

in which $R_1''$ denotes a heterocyclic ring system having at most two rings, which contains a 5-membered to 6-membered heterocyclic ring with two to three rings members singly and directly bonded to the methylbenzene residue and at least one nitrogen atom exclusively bonded into the ring, X represents a hydrogen atom, a halogen atom, a methoxy group or a methyl group, and $n$ is equal to 2 or 3. $R_1''$ may for example be an oxdiazole, thiadiazole, quinazoline, pyrimidine or 1,3,5-triazine residue. As examples there may here be emphasized the oxdiazole and thiadiazole compounds of formula

(14) 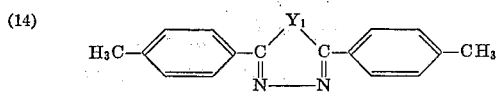

in which $Y_1$ denotes an oxygen or sulphur atom.

(D) Compounds of formula

(15) 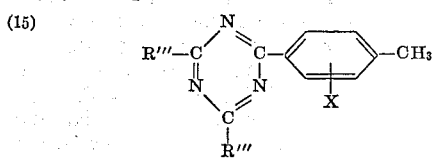

in which $R'''$ denotes, for example, a monocyclic benzene residue and X a hydrogen atom, a chlorine atom, a methoxy group or a methyl group, especially triazines of formula

(16) 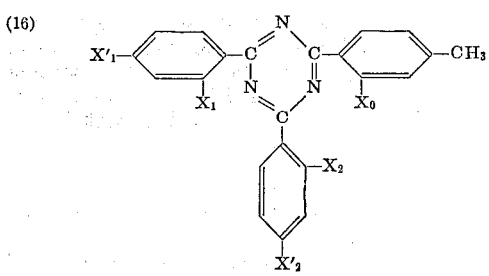

in which $X_0$, $X_1$, $X_2$, $X_1'$ and $X_2'$ denote methyl groups or hydrogen atoms. If at least one of the residues $R'''$ contains a methyl group in the para-position, and/or if at least one of the symbols $X_1'$ or $X_2'$ denotes a methyl group, then these compounds may also correspond to Formula 13.

(E) Compounds according to one of the formulae listed below:

(17) 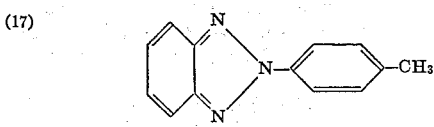

(18) 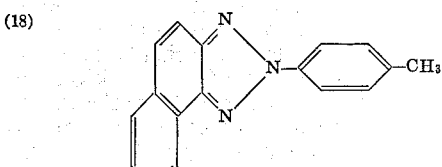

(19) 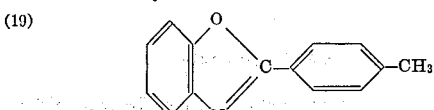

(20) 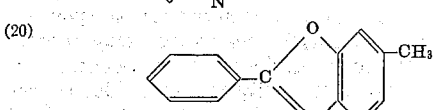

(20a) 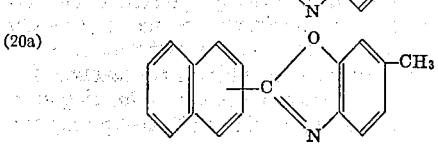

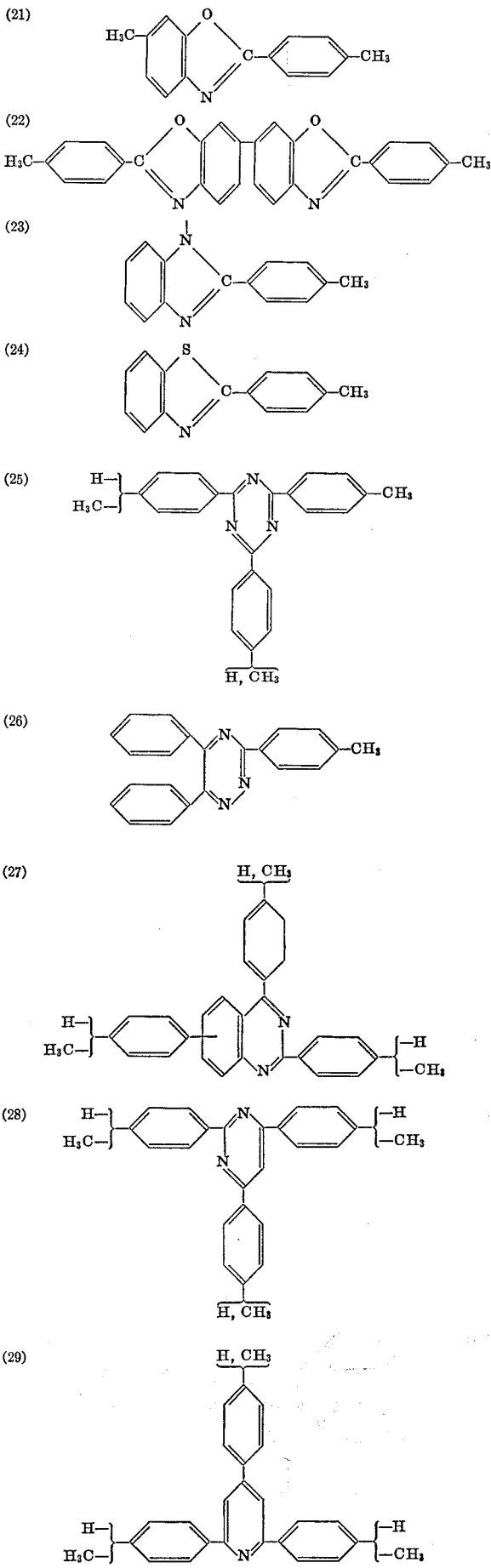

(30) 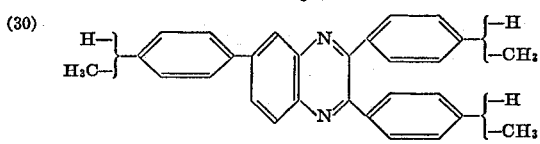

(31) 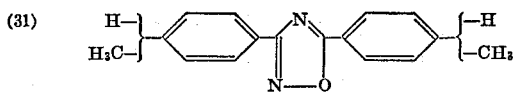

(32) 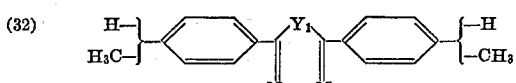

(33) 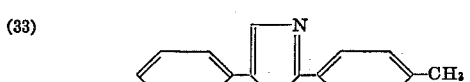

(34) 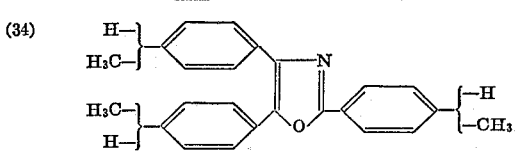

(35) 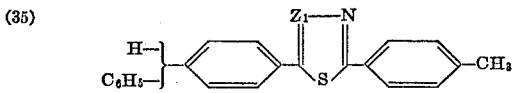

(36) 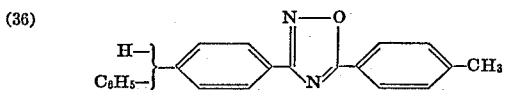

(37) 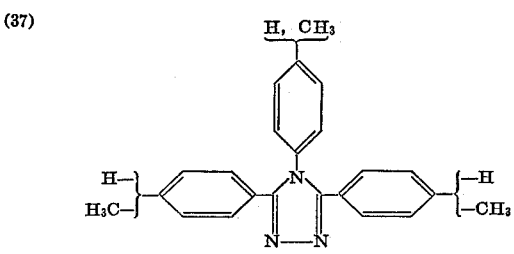

(38) 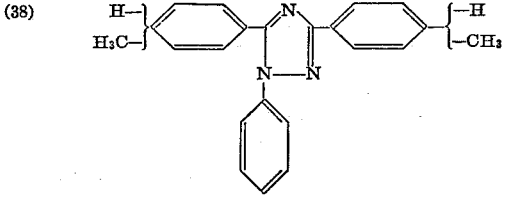

(39) 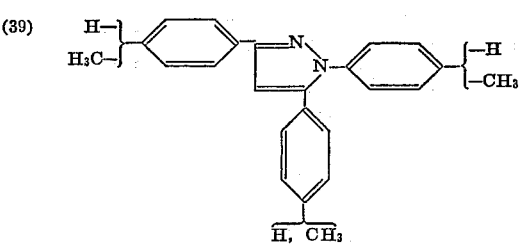

(40) 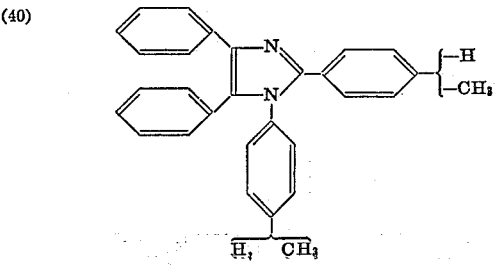

(41) 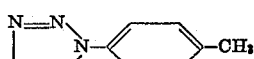

(42) 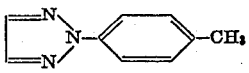

(43) 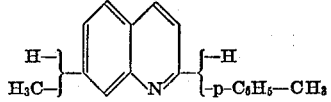

Additionally, the following explanations apply to the preceding formulae:

(1) Terminal phenyl residues may additionally contain further substituents of the alkyl series (especially having 1 to 4 carbon atoms), the halogen series (especially chlorine) or the alkoxy series (especially those having 1 to 4 carbon atoms). (2) Phenyl residues on s-triazine rings may additionally contain methyl groups. (3) Amongst substitution products of compounds according to Formula 19 there are also to be included the corresponding 6-phenyl-benzoxazoles as well as the analogous 1-naphthoxazoles and 2-naphthoxazoles. (4) The symbol

denotes that either a hydrogen atom or a methyl group, but in the entire molecule at least one methyl group, should be present. (5) The significance (as in the corresponding examples) of the symbols $Y_1$ and $Z_1$ is $Y_1 = -O-$ or $-S-$ and $Z_1 = =N-$ or $=CH-$. (6) The symbol

denotes that in this position there may be either a hydrogen atom or a phenyl group.

As may be seen from the preceding compilation, all p-methylphenyl derivatives of nitrogen-containing heterocyclics of aromatic character are in principle accessible to the reaction of the invention and, summarising, the most important categories should again be pointed out, namely such derivatives of pyrrole, pyrazoles, triazoles (1,2,3-, 1,2,4- or 1,3,4), tetrazole, pyridine, pyrimidine, pyrazine, quinazoline, quinoxaline, quinolines, triazines (1,3,5-, 1,2,4-, 1,2,3-), oxdiazoles (1,2,4-, 1,3,4-), benzoxazoles and naphthoxazoles, (iso)oxazoles, imidazoles as well as the corresponding ring systems which are condensed with benzene or naphthalene rings, where these have not already been named.

The Schiff base to be used as the second reagent in the present process must, as will be obvious, be free of reactive methyl groups, for example those in the p-position to the azomethine grouping. Possible Schiff bases are, in turn, the (known) condensation products of aldehydes of aromatic character with primary amines (of aliphatic, aromatic or heterocyclic nature), whose amino group is bonded to a tertiary carbon atom. Compounds of this type may accordingly be written as azomethine compounds of Formula 45

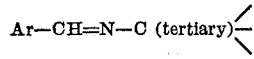

in which Ar denotes an aromatic residue. In this, either one or both of the components required for the synthesis of the Schiff bases (aldehyde and amine) may contain further substituents, provided the above restriction is observed. Since the amine, especially aniline, residue is split off during the reaction and is no longer present in the final product, the presence of substituents in this is generally not indicated and is uninteresting. Nevertheless substituents which do not interfere with or hinder the reaction, for example chlorine atoms, may be present in this ring also. The benzene residue bonded to the =HC-group may for example carry halogen atoms such as bromine or chlorine or alkoxy groups such as methoxy or ethoxy. Preferred interest attaches to Schiff bases of aromatic aldehydes with anilines, that is to say aromatic aldehyde-anils. Such anils for example correspond to the formula (44)

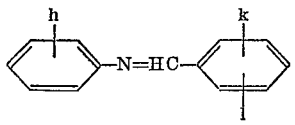

in which $k$ and $l$ may be identical or different and denote hydrogen atoms, chlorine atoms or methoxy groups and in which $h$ represents chlorine or, preferably, hydrogen. Adjacent $k$ and $l$ may together also form a

group. Another important variant of aromatic anils corresponds to the formula (45a)

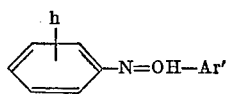

in which $h$ (as above) represents a hydrogen atom or chlorine and Ar' denotes a naphthyl or diphenyl residue. As monoaldehydes suitable for the synthesis of these Schiff bases there may be quoted for example: aldehydes of the benzene series such as benzaldehyde or its halogenated analogues, such as the monochloro-analogues and di-chloro-analogues, alkoxybenzaldehydes such as p-methoxy-benzaldehyde, alkylated benzaldehydes, provided these do not contain any p-methyl groups, such as toluylaldehyde, xylyl-aldehyde and cumoyl-aldehyde, methylene-dioxy-benzaldehyde (piperonal), 4 - dimethylamino-benzaldehyde, 4-diethylamino-benzaldehyde, and diphenyl-aldehyde; aldehydes of the naphthalene series such as α- and β-naphthaldehyde, and heterocyclic aldehydes such as for example furfural and thiophenaldehyde.

As suitable amines there may be named, by way of example, the anilines, naphthylamines or, as an aliphatic representative, tert. butylamine.

Compounds of Formula 1 are reacted with the aldehyde-anils in the presence of a strongly polar, neutral to alkaline, organic solvent which is free of atoms, especially hydrogen atoms, which are replaceable by alkali metals. Such solvents are especially represented by di-alkylated acylamides, preferably those of the type

(46)         [(Alkyl)$_2$N]$_w$-Acyl in which "Alkyl" denotes a loweralkyl group (containing 1 to 4 carbon atoms), especially a methyl group, "Acyl" the residue of a lower carboxylic acid (containing 1 to 4 carbon atoms), especially formic acid or acetic acid, or of phosphoric acid, and $w$ gives the basicity of the acid. As important examples of such solvents there may be quoted dimethylformamide, diethylformamide, dimethylacetamide and hexamethyl-phosphoric acid-triamide. It is also possible to use solvent mixtures.

The reaction furthermore requires a strongly basic alkali compound. By the term strongly basic alkali compounds there are to be understood, within the framework of the present invention, such compounds of the alkali metals (I. main group of the Periodic Table of Elements) including ammonium as have a basic strength of at least about that of lithium hydroxide. Accordingly, they may be compounds of lithium, sodium, potassium, rubidium, caesium or ammonium of, for example, the alcoholate, hydroxide, amide, hydride, sulphide or strongly basic ion exchanger types. Potassium compounds of composition

(47)         KOC$_{m-1}$H$_{2m-1}$ in which $m$ denotes an integer of 1 to 6, such as for example potassium hydroxide or potassium tertiary-butylate, are advantageously used (above all when mild reaction conditions as regards reaction temperature appear to be indicated). In the case of alkali alcoholates and alkali amides (and hydrides) it is here necessary to work in a practically anhydrous medium, whereas in the case of alkali hydroxides water contents of up to 25% (for example contents of water of crystallisation) are admissible. In the case of potassium hydroxide a water content of up to about 10% has proved appropriate. As examples of other alkali compounds which may be used there may be quoted sodium methylate, sodium hydroxide, sodium amide, lithium amide, lithium hydroxide, rubidium hydroxide, caesium hydroxide and the like. Of course it is also possible to work with mixtures of such bases.

In accordance with the preceding explanations, an embodiment of the present invention which is important in practice consists of reacting anils of aldehydes of the benzene and naphthalene series with compounds which correspond to the formula (48)

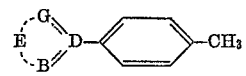

in which formula (a) G, B and D each denote a ring atom of a 5-membered or 6-membered ring system of aromatic character, with at least one of the symbols G, B and D representing a nitrogen atom, where D may, instead of nitrogen, also denote the carbon atom and G as well as B may represent carbon, nitrogen, oxygen or sulphur atoms in the arrangement of ring systems which are in themselves known, (b) E represents the ring member supplementation for a 5-membered or 6-membered ring system of aromatic character containing carbon, nitrogen, oxygen or sulphur atoms in the arrangement of ring systems which are in themselves known, and in which (c) the ring formed together with the symbol E may contain further substituents which do not contain any atoms, particularly hydrogen atoms, which are replaceable by alkali, this reaction being carried out in the presence of an alkali compound having a basic strength of at least that of lithium hydroxide, preferably potassium tertiary-butylate or potassium hydroxide, in a solvent which corresponds to the formula

[(Alkyl)$_2$N]$_w$-Acyl in which "Alkyl" denotes a low alkyl group, "Acyl" the residue of a low aliphatic, carboxylic acid or of phosphoric acid and $w$ the basicity of the acid, preferably in dimethylformamide.

It is appropriate to react the compounds of Formula 1 with the aldehyde-anils in equivalent amounts, so that no component is present in significant excess. As regards the alkali compound, it is advantageous to use at least the equivalent amount, that is to say at least 1 mole, of a compound having, for example, a KO group, per mole of aldehyde-anil. When using potassium hydroxide a 4-fold to 8-fold amount is preferably employed.

The reaction of the invention may generally be carried out at temperatures in the range of between about 10 and 150° C. If alcoholates are used as the potassium compound in the reaction, then the application of heat is generally not necessary. The procedure is, for example, that the aldehyde-aniline is added to the mixture of the compound of Formula 1, the solvent and the potassium alcoholate, preferably with stirring and with exclusion of air, at a temperature of between 15 and 30° C., whereupon the reaction takes place of its own accord, with a slight temperature rise. When using potassium hydroxide it is frequently necessary to work at higher temperatures. For example the reaction mixture is slowly warmed to 30–100° C. and then kept at this temperature for some time, for example ½ to 2 hours. The products may be worked up from the reaction mixture by usual methods which are in themselves known.

The compounds obtainable by the present process are in part known compounds. New compounds are, amongst others, the compounds of the following composition:

(49) 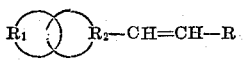

in which $R_1$ denotes a heterocyclic ring system which contains a 5-membered to 6-membered heterocyclic ring having two adjacent ring members directly bonded to $R_2$ and at least one nitrogen atom exclusively bonded into the ring, $R_2$ denotes a benzene ring condensed with the hetero-ring, with the two carbon atoms belonging to both rings and the carbon atom bonded to the —CH= group being in the 1,2,4-position to one another, and R denotes an aromatic residue.

(II) Compounds of formula

(50) 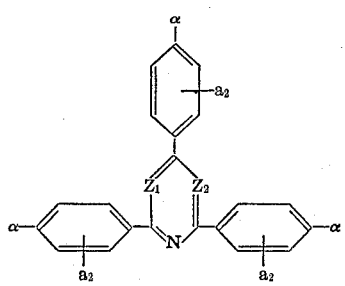

in which $\alpha_2$ represents hydrogen, halogen, the methyl group or the methoxy group, $Z_1$ and/or $Z_2$ denotes a ring member =CH— or =N— and $\alpha$ represents a hydrogen atom, a phenyl residue or a residue of the series

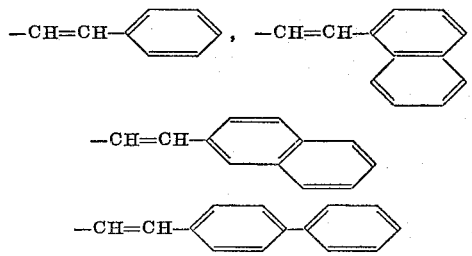

in which (I) at least one residue $\alpha$ differs from hydrogen or phenyl and has the significance of one of the other residues quoted for $\alpha$, and in which (II) terminal phenyl or naphthyl residues may additionally contain 1 to 3 alkyl groups, 1 to 2 halogen atoms or an alkoxy group.

(III) Compounds of formula

(51) 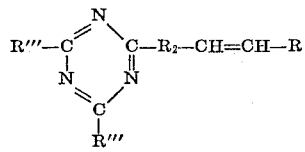

in which R''' denotes an organic residue bonded to the triazine ring by means of a benzene ring, $R_2$ a benzene residue bonded in the 1,4-position to the triazine ring and the —CH= group, and R an aromatic residue.

(IV) Triazine derivatives of formula (158) 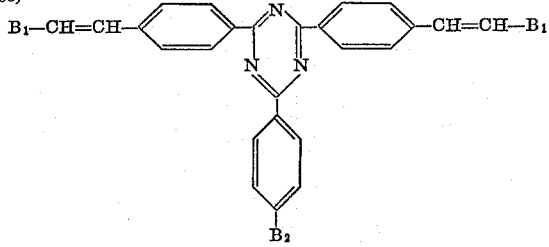

in which $B_1$ represents a phenyl or diphenyl residue and $B_2$ represents hydrogen, a phenyl residue or an alkyl group having 1 to 4 carbon atoms, and in which terminal phenyl residues may contain an alkyl group with 1 to 4 carbon atoms, halogen or a methoxy group, (V) Pyridine derivatives of formula (363) 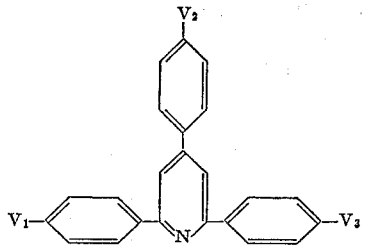

in which $V_1$, $V_2$ or $V_3$ represent hydrogen, a styryl residue or a p-phenylstyryl residue, but in which at least one residue V differs from hydrogen.

(VI) Pyrimidine derivatives of formula (371) 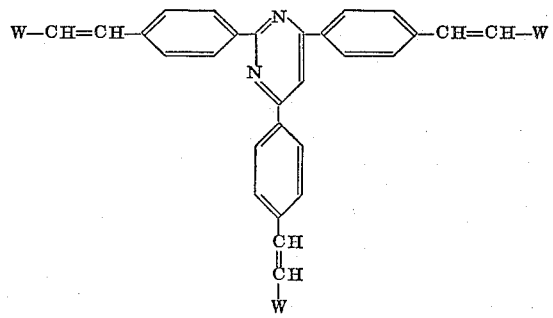

in which W denotes a phenyl, diphenyl, 1-naphthyl or 2-naphthyl residue.

(VII) Compounds of formula

(52) 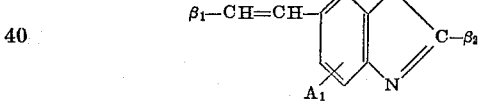

in which $A_1$ represents a hydrogen atom, a methyl group or a halogen atom, $\beta_1$ denotes a residue of the series phenyl, diphenyl, 1-naphthyl or 2-naphthyl and $\beta_2$ represents a residue of the series phenyl, diphenyl, styryl, stilbenyl, p-phenyl-stilbenyl, 1-naphthyl or 2-naphthyl, and where terminal phenyl or naphthyl groups may additionally contain 1 to 3 alkyl groups, 1 to 2 halogen atoms or an alkoxy group.

(VIII) Benzoxazole derivatives of formula (111) 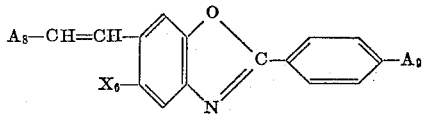

in which $X_6$ represents hydrogen or a methyl group, $A_8$ denotes a phenyl group, a diphenyl group or a 1-naphthyl or 2-naphthyl group, and $A_9$ represents hydrogen, halogen, an alkyl group containing 1 to 4 carbon atoms, a styryl group or p-phenylstyryl group, and where terminal phenyl or naphthyl groups may additionally contain 1 to 3 alkyl groups, 1 to 2 halogen atoms or an alkoxy group.

(IX) Compounds of formula

(53) 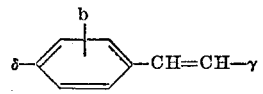

in which $b$ represents a hydrogen atom or a methyl group, $\gamma$ represents a p-isopropylphenyl, diphenyl, 1-naphthyl or 2-naphthyl residue, and δ denotes a residue of the series

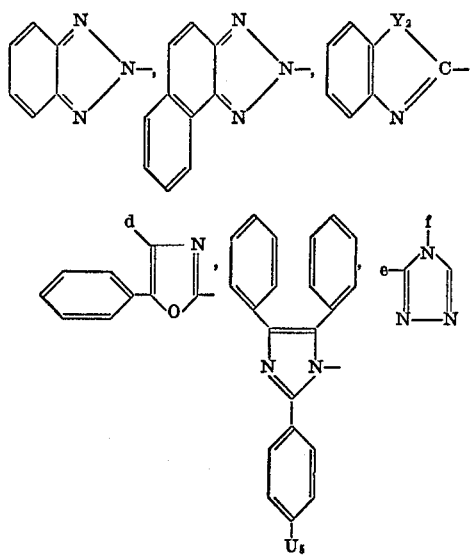

where (I) d represents hydrogen or phenyl, e and f represent phenyl, stilbenyl, p-phenylstilbenyl or benzostilbenyl, and furthermore Y₂ represents a bridge member —O—, —NH— or —N(alkyl)—, where (II) U₅ denotes hydrogen, a styryl residue or a p-phenylstyryl residue, and where (III) terminal phenyl or naphthyl residues may contain 1 to 3 alkyl groups, 1 to 2 halogen atoms or an alkoxy group.

(X) Compounds of general formula (54)

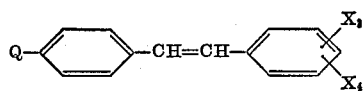

in which the symbol Q represents a benztriazole, naphthotriazole, 2-benzoxazole, 2-naphthoxazole, benzdiazine, 2-oxazole, s-triazine, as-triazine, oxdiazole (optionally arylsubstituted) or benzthiazole residue and X₃ and X₄ denote branched alkyl groups, or one of the substituents X₃ and X₄ denotes a phenyl group or two adjacent substituents X₃ and X₄ denote a condensed-on carbocyclic ring.

(XI) Compounds of formula

55)

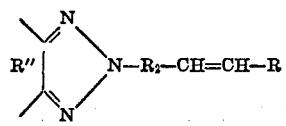

in which R" denotes a benzene or naphthalene ring condensed with the triazole ring in the manner indicated by the valency lines, R₂ denotes a benzene residue bonded to the triazole ring and the —CH= group in the 1,4-position and R denotes a p-isopropylphenyl, biphenylyl or naphthyl residue.

(XII) Oxazole compounds of formula (56)

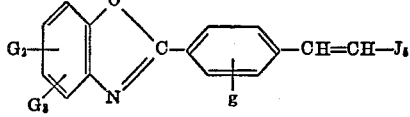

in which G₂ denotes hydrogen, an alkyl group having 1 to 4 carbon atoms, a phenyl group, a phenylalkyl group with 1 to 4 carbon atoms in the alkyl group, halogen or a sulphonamide group, G₃ represents hydrogen or an alkyl group or may, together with an adjacent residue G₂ and the benzene ring to which these G-residues are attached, form a naphthalene ring g represents hydrogen or methyl and J₅ denotes a p-isopropylphenyl, diphenyl, 1-naphthyl or 2-naphthyl residue, where terminal phenyl or naphthyl residues may additionally contain 1 to 3 alkyl groups, 1 to 2 halogen atoms or an alkoxy group.

(XIII) Compounds of formula (57)

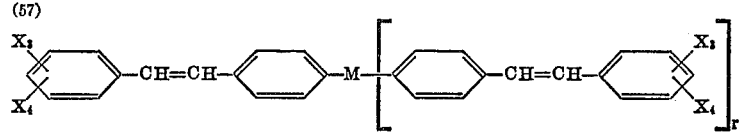

in which M represents a 1,2,4-oxdiazole, 1,3,4-triazole, thiadiazole, s-triazine or bisbenzoxazole residue of formula (57a)

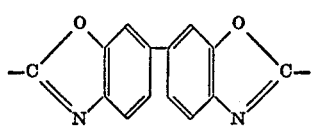

and X₃ and X₄ denote hydrogen, halogen, alkyl (straight-chain or branched) or alkoxy groups, or one of the substituents X₃ and X₄ denotes a phenyl group or two adjacent substituents of a condensed-on carbocyclic ring, and r represents the numbers 1 or 2.

(XIV) Compounds of formula

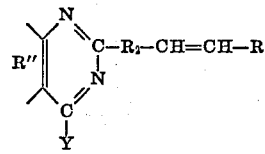

(58)

in which R" represents a benzene ring condensed with the diazine ring in the manner indicated by the valency lines, Y denotes a hydrogen atom or a benzene residue, R₂ denotes a benzene residue bonded to the diazine ring and to the —CH= group in the 1,4-position and R denotes an aromatic residue.

(XV) Compounds of formula

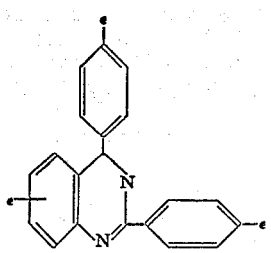

in which one to two residues ε represent a styryl or p-phenyl-styryl residue and the remaining ε residues denote hydrogen atoms.

(XVI) Compounds of formula (141)

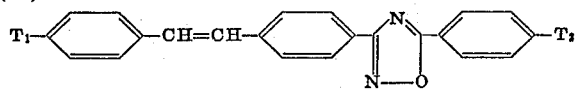

in which $T_1$ represents hydrogen or a phenyl residue and $R_2$ represents hydrogen, a styryl residue or a p-phenylstyryl residue.

(XVII) 1,2,4-triazine compounds of formula (60)

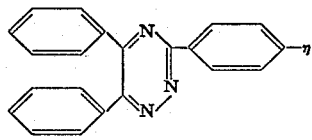

in which η represents a styryl or p-phenylstyryl residue.

(XVIII) Benzthiazole compounds of formula (61)

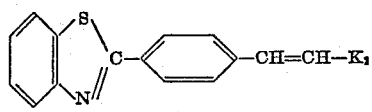

in which $K_2$ represents a diphenyl residue or a 1-naphthyl or 2-naphthyl residue.

(XIX) Compounds of formula (62)

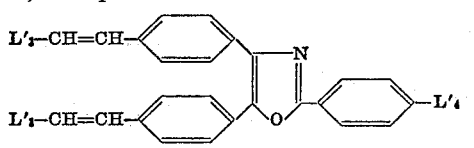

in which $L'_3$ denotes a diphenyl or naphthyl residue and $L'_4$ hydrogen, a styryl residue or a p-phenylstyryl residue.

(XX) Compounds of formula (306)

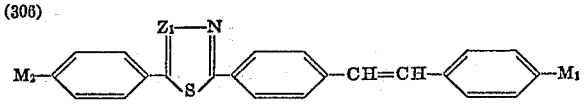

in which $M_1$ and $M_1$ represent hydrogen or phenyl and $Z_1$ represents a bridge member =CH— or =N—.

(XXI) Compounds of formula (314)

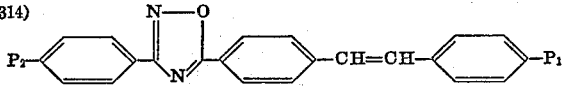

in which $P_1$ represents hydrogen, an alkyl group containing 1 to 6 carbon atoms or a phenyl group and $P_2$ represents hydrogen or a phenyl group.

(XXII) Compounds of formula (340)

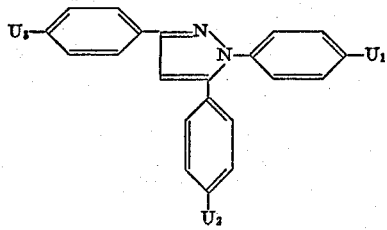

in which $U_1$, $U_2$ and $U_3$ denote a hydrogen atom, a styryl residue or a phenylstyryl residue and at least one symbol U differs from hydrogen.

(XXIII) Compound of formula (379)

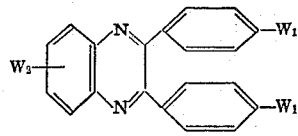

in which $W_1$ and $W_2$ denote a hydrogen atom, a styryl group or a p-phenylstyryl group, but at least one symbol W differs from hydrogen.

(XXIV) Compounds of formula (386)

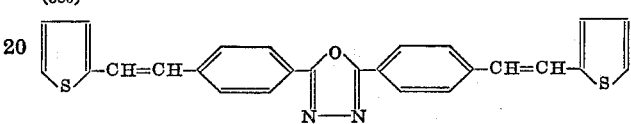

or (387)

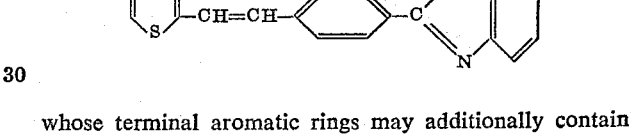

whose terminal aromatic rings may additionally contain alkyl groups, halogen atoms or alkoxy groups.

In these formulae quoted under numbers I to XXIV possible alkyl groups in principle also include long chain alkyl groups, but in practice it is mostly alkyl groups containing up to about 8 carbon atoms, preferably 1 to 4 carbon atoms, and especially branched-chain alkyl groups, which require consideration.

Though again in the case of alkoxy groups higher members, that is to say those containing 4 or more carbon atoms, as well as polyalkyleneoxy groups, are possible, the predominant practical significance resides in alkoxy groups containing 1 to 4 carbon atoms. Amongst the halogens quoted, chlorine is of especial interest.

The new compounds of the formulae of the preceding groups I to XXIV may be used as intermediates, for example for the manufacture of dyestuffs or pharmaceuticals. It is also possible subsequently to introduce acid groups conferring water solubility into the new compounds, by methods which are in themselves known.

A large number of compounds of general Formula 49, especially those of Formulae 50, 51, 52, 53, 54, 55, 56, 57, 61, 111, 158, 306, 363 and 371 may, as has further been found, be used as optical brighteners provided they do not contain any chromophoric groups.

From the point of view of use as optical brighteners for the most varied organic materials in which optical brighteners are desirable, the types of compound which are advantageously accessible by the above process may also be classified as follows:

(a) Compounds of formula (63)

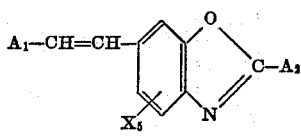

in which $A_1$ denotes a phenyl, diphenylyl or naphthyl residue, $A_2$ denotes a phenyl, diphenylyl, naphthyl or stilbenyl residue, and $X_5$ represents hydrogen, alkyl or halogen.

(b) Compounds of formula

(64)
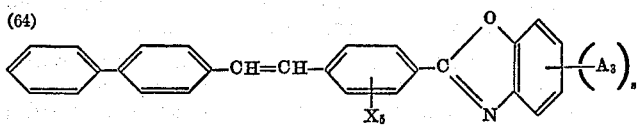

in which $A_3$ represents hydrogen, an alkyl group having 1 to 18 carbon atoms, an aryl residue, especially a phenyl residue, an aralkyl residue (especially a phenyl-$C_{1-4}$-alkyl residue) or a halogen atom and $s$ denotes an integer from 1 to 3, preferably 1, and $X_5$ represents hydrogen, alkyl or halogen.

(c) Compounds of formula

(65)
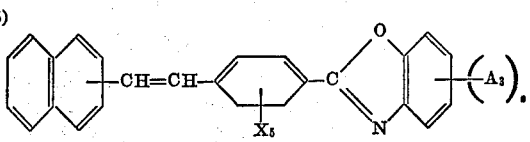

in which $A_3$ represents hydrogen, an alkyl group having 1 to 18 carbon atoms, an aryl residue, especially a phenyl residue, an aralkyl residue especially a phenyl-$C_{1-4}$-alkyl residue or a halogen atom and $s$ denotes an integer from 1 to 3, preferably 1, and $X_5$ represents hydrogen, alkyl or halogen.

(d) Compounds of formula

(66)
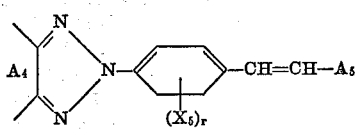

in which $A_4$ represents the remainder of the benzene or naphthalene ring, $A_5$ denotes a diphenylyl or naphthyl residue, $X_5$ represents hydrogen, alkyl or halogen and $r$ represents 1 or 2.

(e) Compounds of formula

(67)
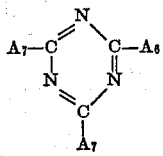

in which $A_6$ denotes a residue of the series (67a)
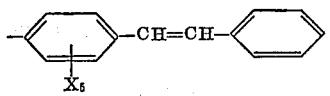

(67b)
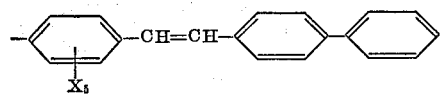

(67c)
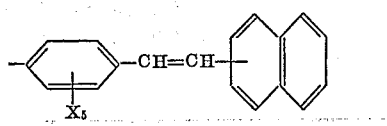

$A_7$ denotes a phenyl, diphenylyl or naphthyl residue or a residue $A_6$, and these quoted aromatic residues may additionally contain 1 to 2 substituents $X_5$ having the significance of hydrogen, alkyl or halogen, preferably in the phenylene nuclei described under $A_6$.

The categories of compounds emphasised above as regards their brightener effect possess a more or less pronounced fluorescence in the dissolved or finely divided state. They are suitable for optical brightening of the most diverse organic materials of natural or synthetic origin, or of materials containing such organic substances for which optical brightening is relevant. As such materials there may for example be quoted the following group of organic materials, without the recital which follows in any way being intended to express any limitation in this respect:

(I) Synthetic organic high molecular materials such as (A) polymerisation products based on organic compounds containing at least one polymerisable carbon-carbon double bond (homopolymers or copolymers as well as their post-treatment products such as cross-linking products, graft products or degradation products, polymer dilutions and the like), as examples of which there may be quoted: polymers based on $\alpha,\beta$-unsaturated carboxylic acids (for example acrylic compounds), olefine hydrocarbons, vinyl and vinylidene compounds, halogenated hydrocarbons, unsaturated aldehydes and ketones, allyl compounds and the like; furthermore polymerisation products such as are obtainable by ring opening (for example polyamides of the polycaprolactam type), furthermore formaldehyde polymers, or polymers which are obtainable both by polyaddition and by polycondensation such as polythioethers, polyacetals and thioplastics. (B) Polycondensation products or precondensates based on bifunctional or polyfunctional compounds with groups capable of condensation, their homocondensation and co-condensation products as well as post-treatment products (for example saturated and unsaturated, unbranched or branched, polyesters), polyamides, maleate resins, their pre-condensates and products of analogous structure, polycarbonates, silicone resins and others; (C) polyaddition products such as polyurethanes (cross-linked and uncross-linked) or epoxide resins.

(II) Semi-synthetic organic materials such as for example cellulose esters, nitrocellulose, cellulose ethers, regenerated cellulose or their post-treatment products, and casein plastics.

(III) Natural organic materials with animal or vegetable origin, for example based on cellulose or on proteins such as wool, cotton, silk, leather, wood compositions in a finely divided form, natural resins, and furthermore rubber, guttapercha, balata as well as their post-treatment products and modification products.

The organic materials requiring consideration may be present in the most diverse processing states (raw materials, semi-finished goods or finished goods) and states of aggregation. They may thus be present in the form of the most diverse shaped articles, for example as sheets, profiles, injection mouldings, chips, granules, and foams; films, foils, lacquers, strips, coverings, impregnations and coatings or filaments, fibres, flocks, bristles and wires. The materials quoted may on the other hand also be present in an unshaped state in the most diverse homogeneous and inhomogeneous forms of distribution and states of aggregation, for example as powders, solutions, emulsions, dispersions, sols, gels, putties, pastes, waxes, adhesives and trowelling compositions and the like.

Fibre material may for example be present as continuous filaments, staple fibres, flocks, hanks, yarns, threads, fibre fleeces, felts, waddings, flocked structures, woven textile fabrics or laminates, knitted fabrics as well as papers, cardboards or paper compositions and the like.

When used as brighteners, these compounds may be added to the materials quoted either before or during shaping. Thus for example they may be added to the moulding composition in the manufacture of films or other moulded articles, or they may be dissolved, dispersed or otherwise finely divided in the spinning composition before spinning. The optical brighteners may also be added to the starting substances, reaction mixtures or intermediate products for the manufacture of fully synthetic or semi-synthetic organic materials, that is to say also before or during the chemical reaction, for example in the case of a polycondensation, a polymerisation or a polyaddition.

The new optical brighteners may of course also be employed in all cases where organic materials of the type indicated above are combined with inorganic materials in any form. They are distinguished by exceptionally good heat stability, light fastness and resistance to migration.

The amount of the new optical brighteners to be used, relative to the material to be optically brightened, may vary within wide limits. A clear and durable effect can already be achieved with very small amounts, in some cases for example with amounts of 0.001 percent by weight. However amounts of up to about 0.5 percent by weight and more may also be used. For most practical purposes amounts of between 0.01 and 0.2 percent by weight are preferably of interest.

The compounds serving as brighteners may for example also be employed as follows: (a) mixed with dyestuffs or pigments or as an additive to dye baths, printing, etching or reserve pastes. Further also for the post-treatment of dyeings, prints or discharge prints; (b) mixed with so-called "carriers," antioxidants, light protection agents, heat stabilisers, chemical bleaching agents or as an additive to bleaching baths; (c) mixed with cross-linking agents, finishing materials such as starch or synthetically produced finishes; (d) in combination with detergents, where the detergent and the brightener may be separately added to the wash baths to be used, or preferably detergents are used which contain the brightener mixed into them; (e) in combination with polymeric carriers (polymerisation, polycondensation or polyaddition products), in which the brighteners are optionally introduced alongside other substances in a dissolved or dispersed form, (f) as additives to the most diverse industrial products in order to make these more marketable or to avoid disadvantages in their usability, for example as an additive to glues, adhesives, paints and the like.

The compounds which have been emphasised as optical brighteners may also be used as scintillators for various photographic purposes, such as for electrophotographic reproduction or for super-sensitisation.

In the tables which follow later on, symbols have the following significance:

Column I=formula number
Column II=structural elements
Column III=crude yield in percent
Column IV=recrystallisation medium, with these being designated by the numbers listed below: 1=water, 2=ethanol, 3=dioxane, 4=dimethylformamide, 5= tetrachloroethylene, 6=chlorobenzene, 7=o-dichlorobenzene, 8=trichlorobenzene, 9=toluene, 10=n-hexane, 11=xylene.
Column V=colour of the purified reaction of product, with the latter having been designated by the numbers listed below: 1=colourless, 2=almost colourless, 3= pale green, 4=light green, 5=pale yellow, 6=light yellow, 7=yellow, 8=pale greenish yellow, 9=light greenish yellow, 10=greenish yellow.

Column VI=melting point (uncorrected) in ° C.
Column VII=elementary formula and analytical data (upper line calculated, lower line found).

The starting materials (or the methods for their preparation) to be used for preparing the compounds in the following examples are known in the art (see Helvetica Chimica Acta, vol. 50, Fasc. 3, pp. 946 to 957).

EXAMPLE 1

7.13 g. of 2-diphenylyl-(4')-6-methylbenzoxasole of formula (109)

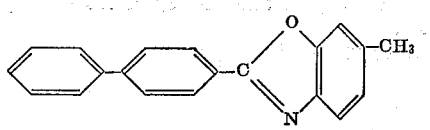

and 4.53 g. of benzalaniline are stirred into 200 ml. of anhydrous dimethylformamide with exclusion of air and treated all at once with 7.45 g. of potassium tertiary butylate. The colour of the reaction solution changes immediately from pale yellow to dark brown and the temperature rises by 5 to 10° C. over the course of 4 minutes. The mixture is stirred for a further 35 minutes without external warming, during which the temperature falls by a few ° C. Thereafter 350 ml. of water are added dropwise at 5 to 15° C. and the precipitated reaction product is filtered off and washed with water until neutral.

The moist filter residue is now dissolved in 200 ml. of dimethylformamide with warming, treated with 25 ml. of 10% hydrochloric acid and after one hour with 200 ml. of water, and cooled to about 10° C. After filtering, washing with water and methanol and subsequent drying about 6.3 g., corresponding to 67.5% of theory, of the compound of formula (110)

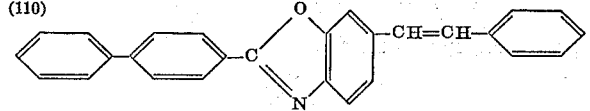

are obtained in the form of a brownish yellow powder. Three recrystallisations from tetrachloroethylene with the aid of fuller's earth yield pale green glistening platelets of melting point 203 to 203.5° C.

*Analysis.*—$C_{27}H_{19}ON$ (373.43). Calculated (percent): C, 86.84; H, 5.13; N, 3.75. Found (percent): 86.72; H, 5.01; N, 3.67.

The benzoxazole derivatives of formula (111)

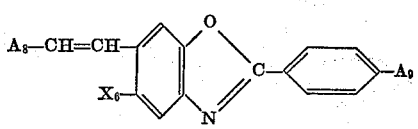

listed in the table which follows may be prepared in a similar manner, with the duration of the reaction being extended to 60 minutes.

| | II | | | III | IV | V | VI | VII |
|---|---|---|---|---|---|---|---|---|
| I | $A_8$ | $X_6$ | $A_9$ | | | | | |
| 112 | –⟨phenyl⟩ | H | H | 77.6 | 2 | 1 | 146–146.5 | $C_{21}H_{15}ON$<br>C, 84.82; H, 5.09; N, 4.71<br>C, 84.87; H, 5.24; N, 4.55 |
| 113 | –⟨phenyl⟩ | H | –C(CH₃)₃ | 77.3 | 2 | 1 | 141–141.5 | $C_{25}H_{23}ON$<br>C, 84.95; H, 6.56; N, 3.96<br>C, 84.76; H, 6.08; N, 4.00 |
| 114 | –⟨phenyl⟩–OCH₃ | H | –⟨phenyl⟩ | 60.5 | 2/3 | 9 | 232–232.5 | $C_{28}H_{21}O_2N$<br>C, 83.35; H, 5.25; N, 3.47<br>C, 83.23; H, 5.12; N, 3.45 |
| 115 | –⟨phenyl⟩–OCH₃ | H | –Cl | 51.4 | 5 | 5 | 199–199.5 | $C_{22}H_{16}O_2NCl$<br>C, 73.03; H, 4.46; N, 3.87<br>C, 73.16; H, 4.51; N, 3.90 |

TABLE—Continued

| I | II A8 | X5 | A9 | III | IV | V | VI | VII |
|---|---|---|---|---|---|---|---|---|
| 116 | biphenyl | H | —H | 97 | 5 | 3 | 215–216 | $C_{27}H_{19}ON$<br>C, 86.84; H, 5.13; N, 3.75<br>C, 86.85; H, 5.22; N, 3.75 |
| 117 | biphenyl | CH | —C(CH$_3$)$_3$ | 92.1 | 5 | 2 | 199.5–200 | $C_{31}H_{27}ON$<br>C, 86.68; N, 6.34; N, 3.26<br>C, 86.72; N, 6.38; N, 3.21 |
| 118 | biphenyl | H | phenyl | 87.5 | 6 | 9 | 289–289.5 | $C_{33}H_{23}ON$<br>C, 88.17; H, 5.16; N, 3.12<br>C, 87.98; H, 5.19; N, 3.15 |
| 119 | naphthyl | H | —C(CH$_3$)$_3$ | 100 | 3/2 | 1 | 185.5–186 | $C_{20}H_{25}ON$<br>C, 86.32; H, 6.25; N, 3.47<br>C, 86.27; H, 6.22; N, 3.53 |
| 120 | naphthyl | H | phenyl | 76.7 | 5 | 9 | 248–249 | $C_{31}H_{21}ON$<br>C, 87.91; H, 5.00; N, 3.31<br>C, 87.75; H, 4.86; N, 3.45 |
| 121 | phenyl | —CH$_3$ | phenyl | 74.4 | 3/2 | 3 | 179.5–180.5 | $C_{28}H_{21}ON$<br>C, 86.79; H, 5.46; N, 3.62<br>C, 86.59; H, 5.53; N, 3.63 |
| 122 | biphenyl | —CH$_3$ | phenyl | 100 | 4 | 9 | 259–259.5 | $C_{34}H_{25}ON$<br>C, 88.09; H, 5.44; N, 3.02<br>C, 87.79; H, 5.48; N, 3.06 |
| 123 | naphthyl | —CH$_3$ | phenyl | 78.6 | 3/2 | 9 | 228–228.5 | $C_{32}H_{23}ON$<br>C, 87.84; H, 5.30; N, 3.20<br>C, 87.56; H, 5.44; N, 3.30 |
| 124 | naphthyl | —CH$_3$ | phenyl | 85.0 | 3/2 | 10 | 202.5–203 | $C_{32}H_{23}ON$<br>C, 87.84; H, 5.30; N, 3.20<br>C, 87.59; H, 5.41; N, 3.35 |
| 125 | 4-Cl-phenyl | —CH$_3$ | phenyl | 66.4 | 2 | 5 | 200–201 | $C_{28}H_{20}ONCl$<br>C, 79.71; H, 4.78; N, 3.32<br>C, 79.95; H, 4.61; N, 3.40 |
| 126 | 4-OCH$_3$-phenyl | —CH$_3$ | phenyl | 52.6 | 10/11 | 5 | 191.5–192 | $C_{29}H_{23}O_2N$<br>C, 83.43; H, 5.55; N, 3.36<br>C, 83.35; H, 5.81; N, 3.29 |

EXAMPLE 2

5.93 g. of 1-[5',6'-dimethyl-benzoxazolyl-(2')]-4-methylbenzene of formula (127)

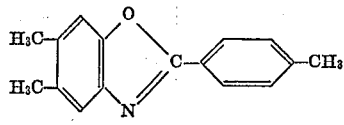

[melting point: 207 to 207.5° C.] and 9.06 g. of benzalaniline are stirred into 250 ml. of anhydrous dimethylformamide with exclusion of air and treated all at once with 16.8 g. of potassium tertiary butylate. The light beige reaction mixture immediately assumes a violet brown colour and the temperature rises by 6° C. The mixture is stirred for a further 90 minutes without external warming and thereafter firstly 300 ml. of water and then 100 ml. of 10% strength aqueous hydrochloric acid are added dropwise. The precipitated reaction product is filtered off, washed with water and methanol and dried. About 4.5 g., corresponding to 43.5% of theory, of the compound of formula (128)

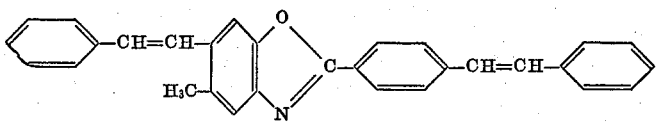

are obtained in the form of a brown powder. After chromatography in tetrachloroethylene on activated aluminium oxide and recrystallisation from dioxane/ethanol light greenish yellow fine needles of melting point 222 to 223° C. are obtained.

Analysis.—C$_{30}$H$_{23}$ON (413.49). Calculated (percent): C, 87.14; H, 5.61; N, 3.39. Found (percent): C, 87.12; H, 5.62; N, 3.49.

The following benzoxazole derivatives may be prepared in a similar manner:

(129)

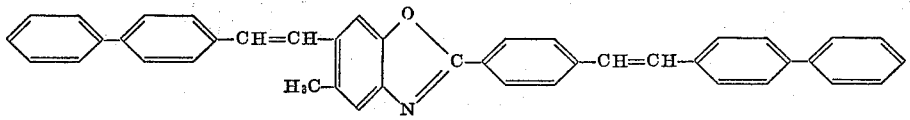

Yield: about 12.8 g., corresponding to 90.5% of theory. Greenish yellow fine needles from o-dichlorobenzene. Melting point: 296.5 to 298.5° C.

Analysis.—C$_{42}$H$_{31}$ON (565.68). Calculated (percent): C, 89.17; H, 5.52; N, 2.48. Found (percent): C, 88.96; H, 5.70; N, 2.64.

(130)

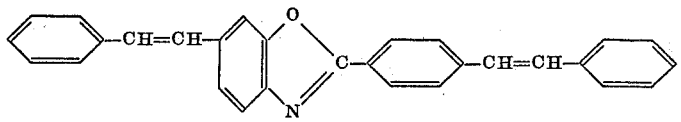

Yield: 22% of theory. Light greenish yellow fine glistening needles from tetrachlorethylene. Melting point: 260 to 260.5° C.

Analysis.—C$_{29}$H$_{21}$ON (399.47). Calculated (percent): C, 87.19; H, 5.30; N, 3.51. Found (percent): C, 87.04; H, 5.32; N, 3.71.

EXAMPLE 3

A polyester fabric (e.g. "Dacron") is padded at room temperature about 20° C.) with an aqueous dispersion containing per litre 2 g. of one of the compounds of Formulae 110, 114 to 126 or 128, as well as 1 g. of an addition product of about 8 mols of ethylene oxide with 1 mol of para-tert. octylphenol, and dried at about 100° C. The dry material is subsequently subjected to a heat treatment at 150 to 220° C., which lasts from 2 minutes to a few seconds depending on the temperature. The material treated in this way has a substantially whiter appearance than the untreated material.

EXAMPLE 4

100 parts of polyester granules of terephthalic ethyleneglycolpolyester are intimately mixed with 0.05 part of one of the stilbene derivatives of Formulae 110, 114 to 126 or 128, and melted at 285° C. whilst stirring. When the spinning melt is spun through conventional spinnerets, powerfully brightened polyester fibres are obtained.

EXAMPLE 5

10,000 parts of polyamide chips prepared in the known manner from hexamethylenediaminadipate are mixed for 12 hours in a tumbling vessel with 30 parts of titanium dioxide (rutile modification) and 2 parts of the compound of Formulae 110, 114 to 126 or 128. The chips treated in this manner are melted in a boiler—after it has been swept with superheated steam to displace the atmospheric oxygen—which is heated with oil or diphenyl steam to a temperature of 300 to 310° C., and stirred for half an hour. The melt is hereupon expressed through a spinneret under nitrogen pressure of 5 atmospheres (gauge), and the thus spun, cooled filament wound onto a spinning bobbin. The resulting threads have an excellent brightening effect.

EXAMPLE 6

100 g. of polypropylene "Fibre-Grade" are intimately mixed with 0.02 g. of the compound of Formula 118 or 122 respectively and melted, whilst stirring, at a temperature of 280 to 290° C. When the melt is spun through conventional spinnerets and stretched, polypropylene fibres of excellent brightening effect which are fast to light are obtained.

What is claimed is:

1. A benzoxazole derivative of the formula

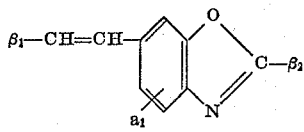

in which $a_1$ represents hydrogen, methyl or halogen, $\beta_1$ is phenyl, diphenyl, 1-naphthyl or 2-naphthyl and $\beta_2$ is phenyl, diphenyl, styryl, stilbenyl, p-phenylstilbenyl, 1-naphthyl or 2-naphthyl, and in which terminal phenyl and naphthyl may additionally contain 1 to 3 alkyl groups, 1 to 2 halogen atoms or an alkoxy group.

2. A benzoxazole derivative according to claim 1 of the formula

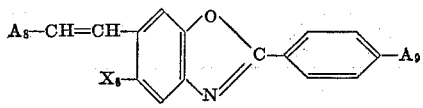

in which $X_6$ represents hydrogen or methyl, $A_8$ is phenyl, diphenyl, 1-naphthyl or 2-naphthyl and $A_9$ is hydrogen, halogen, alkyl containing 1 to 4 carbon atoms, styryl or p-phenylstyryl, and in which terminal phenyl or naphthyl may additionally contain 1 to 3 alkyl groups, 1 to 2 halogen atoms or an alkoxy group.

3. A benzoxazole derivative as claimed in claim 1 of the formula

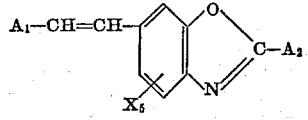

wherein $A_1$ is phenyl, diphenyl or naphthyl, $A_2$ is phenyl, diphenyl, naphthyl or stilbenyl, and $X_5$ represents hydrogen, methyl or halogen.

4. A benzoxazole derivative as claimed in claim 1 of the formula

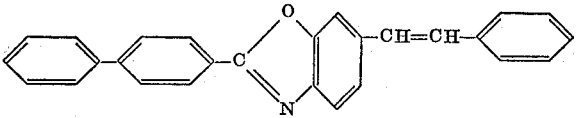

5. A benzoxazole derivative as claimed in claim 1 of the formula

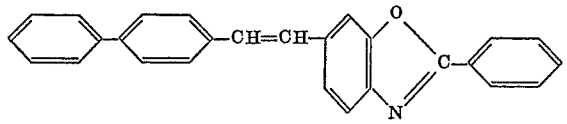

6. A benzoxazole derivative as claimed in claim 1 of the formula

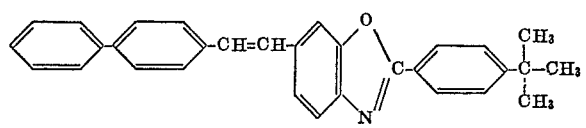

References Cited

FOREIGN PATENTS 1,131,484  10/1968  England _____ 260—240

OTHER REFERENCES

Al'perovich et al., Zhur. Obsch. Khim. vol. 28, pp. 2538 to 2547 (1958).

Al'perovich et al., Zhur. Obsch. Khim. vol. 29, pp. 3376 to 3379 (1959).

Al'perovich et al., Zhur. Obsch. Khim. vol. 29, pp. 4045 to 4048 (1959).

JOHN D. RANDOLPH, Primary Examiner

U.S. Cl. X.R.

260—240.1; 240 A, 248 CS, 250, 251 Q, 283 R, 290 R, 302 F, 302 SN, 307 D, 307 G, 308 B, 309, 309.2, 310 R, 566 F

UNITED STATES PATENT OFFICE
CERTIFICATE OF CORRECTION

Patent No. 3,711,472          Dated January 16, 1973

Inventor(s) Adolf Emil Siegrist et al

It is certified that error appears in the above-identified patent and that said Letters Patent are hereby corrected as shown below:

Column 3, line 54, "R" should be --- $R_1$ ---.

Column 4, in the formula at line 35, "$R_1$" should be --- $R_1'$ ---.

Column 10, in formula 48, "$B\!\!\!\diagup^{\!\!\!D}$" should be --- $B\!\!\!\diagup^{\!\!\!D}$ ---.

Column 11, line 28, "$\alpha_2$" should be --- $a_2$ ---.

Column 15, line 55, before "represent", "$M_1$" should be --- $M_2$ ---.

Column 21, under "$X_6$", line 2, "CH" should be --- H ---.

Signed and sealed this 6th day of August 1974.

(SEAL)
Attest:

McCOY M. GIBSON, JR.          C. MARSHALL DANN
Attesting Officer             Commissioner of Patents